United States Patent [19]
Bergh et al.

[11] Patent Number: 5,967,606
[45] Date of Patent: *Oct. 19, 1999

[54] UNIVERSAL, ADAPTABLE SHOPPING CART CUSHION

[76] Inventors: Joan Bergh, 8425 E. Wilshire Dr., Scottsdale, Ariz. 85257; Marla J Wagner, 403 W. Aire Libre, Phoenix, Ark. 85023; Ken L Bergh, 3626 S. Newberry, Tempe, Ariz. 85282

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,273
[22] Filed: Mar. 27, 1997
[51] Int. Cl.⁶ ..................................... A47C 31/00
[52] U.S. Cl. ............................... 297/256.17; 297/219.12
[58] Field of Search ........................... 297/219.1, 219.12, 297/256.17, 229, 224, 225, 228.11

[56] References Cited

U.S. PATENT DOCUMENTS

| | | | |
|---|---|---|---|
| 3,578,380 | 5/1971 | Jacobus | 297/229 |
| 4,655,502 | 4/1987 | Houllis | 297/229 |
| 4,666,207 | 5/1987 | Quartano . | |
| 4,805,937 | 2/1989 | Boucher . | |
| 4,946,221 | 8/1990 | Livingston | 297/224 X |
| 5,238,293 | 8/1993 | Gibson | 297/229 |
| 5,309,586 | 5/1994 | Sies et al. | 297/219.12 X |

*Primary Examiner*—Peter R. Brown
*Attorney, Agent, or Firm*—Donald J. Lenkszus; Bryan Cave, LLP

[57] ABSTRACT

A universal, adaptable shopping cart cushion (10) easily envelopes all surrounding areas of the shopping cart seat giving complete coverage over the handle, seat, sides, top edges and back. The adjustable perimeter seam (25) allows easy adaptability to various size shopping carts. This cushion provides a child riding in a shopping cart seat, with a comfortable, safe, and sanitary environment. Safety seat belts (19) are installed for the child's safety and security and an adjustable perimeter seam (25) simplifies and expedites the installation and removal of the cushioned cover. An elastic strap (26) secures the cushion when rolled for easy, compact storage. Sanitation is maintained by an easy, washable material and design. The cushion provides protection from being pinched, scratched or harmed by the hard movable shopping cart seat and protection from the results of various weather conditions.

14 Claims, 3 Drawing Sheets

UNIVERSAL, ADAPTABLE SHOPPING CART CUSHION

BACKGROUND OF THE INVENTION

1. Field of the Invention

The present invention is in the general field of utilitarian child comfort and cleanliness devices. This invention relates to the utilitarian protection, safety, and comfort of a child when seated in shopping cart seats as those made available in retail establishments.

2. Description of the Prior Art

There are several types of shopping cart seat covers to provide comfort and protection which are known in prior art.

| U.S. Pat. No. | Patentee | Date |
| --- | --- | --- |
| 3,578,380 | Jacobus | May 11, 1971 |
| 4,666,207 | Quartano | May 17, 1987 |
| 4,805,937 | Boucher/Mitchell | Feb. 21, 1989 |
| 5,238,293 | Gibson | Aug. 24, 1993 |

Jacobus (U.S. Pat. No. 3,578,380) discloses a sanitary cover 31 formed of a lightweight, pliable sheet of material configured to fit the shopping cart seats. A double back portion 32 of the sheet slides over the back portion of the shopping cart seat, a center portion fits the sides, bottom and front of the seat with openings in the front to match openings in the cart seat, and an edge portion disposable over the top cart bars and handle. Ties are provided to hold the cover on the cart seat and elastic is stretched about the top edge.

Quartano (U.S. Pat. No. 4,666,207) discloses a seating and back cushion and a cushioned groin protecting link attached to a chest protecting element and a means to stabilize a child against lateral movement when seated on a shopping, cart shelf.

Boucher/Mitchell (U.S. Pat. No. 4,805,937) discloses a handle, seat cover and lower sides with VELCRO fasteners for securing strip around handle of conventional shopping carts. This padded cover provides protection against germs and diseases.

Gibson (U.S. Pat. No. 238,293) discloses a quilted cover comprising a sheet of three rectangular panels. The first rectangular panel located at the rear end of the sheet is held around the handle of the shopping cart with fastener strips and the forward end of the sheet having a second rectangular panel, the sheet having a central panel extending between the first and second rectangular panels, the second rectangular panel being folded downward and beneath the central panel along a fold line where the central panel connects with the second rectangular panel, the vertical side edges of the second rectangular panel being stitched to bottom surface of the central panel, the fold-back and stitched second rectangular panel forming a pocket which slides over a portion of the cart on a pivotal back member that folds away from the handle portion of shopping cart.

Though the above patents provide advantages, there are a number of disadvantages:

(a) Above devices require multiple points to secure the installation of seat covers. This makes installation time-consuming and difficult while handling a child.

(b) Velcro closures and snaps are easily undone, where accessible, as the child matures and masters new talents. After much use with lint accumulation, Velcro may lose their effectiveness.

(c) Side edges of some shopping cart seats are unprotected and accessible for children to touch or mouth.

(d) In addition, some children nap to the side of the cart where little or no cushioning or protective covering is provided.

(e) Sliding the pocket of the fabric over the back of the shopping cart is time-consuming and does not allow an expedient installation and removal of the cushion.

While the above-mentioned patents cover, protect, and cushion shopping cart seats, there is currently no device available as ascertained from the Public Records which provides the uniqueness and adaptability of an adjustable perimeter that would provide the versatility of easily covering the entire seating area and cushioning various sizes and shapes of shopping carts, as well as the expedient installation and removal of the cushion.

OBJECTS AND ADVANTAGES

The present invention has a new, uniquely, adjustable perimeter and provides an improved and more complete covering and cushion for a shopping cart seat and has all the advantages of the prior art handle and seat covers and yet, none of the disadvantages. Only this universal, adaptable cushion can be placed easily over the seating area of the shopping cart. The enclosed drawings illustrate these improved concepts of the present invention which is a universal, adaptable, cushioned cover that stretches over the shopping cart handle, extends across the seat, sides, top edges and back of the infant seat encompassing the entire shopping cart seat. Accordingly, several improvements, objects, and advantages of our present invention are:

(a) to provide a new and improved universal, adaptable shopping cart cushion which has new, improved advantages and all the advantages of the prior art handle and seat covers and has none of the disadvantages;

(b) to provide a new and improved universal, adaptable shopping cart cushion which may be adjustable to various shopping cart seats but not limited to the conventional shopping cart;

(c) to provide a new and improved universal, adaptable shopping cart cushion for a shopping cart which may be easily and efficiently produced and marketed;

(d) to provide a new and improved universal, adaptable shopping cart cushion for a shopping cart which is of a durable, reliable, and washable construction;

(e) to provide a new and improved universal, adaptable shopping cart cushion for a shopping cart which is susceptible to low cost of manufacture with regard to material, simplicity of design and labor, and which accordingly is then susceptible to low prices for sale to the consuming public, thereby making the universal, adaptable shopping cart cushion more economically available to the buying public;

(f) to provide a new and improved universal, adaptable shopping cart cushion for a shopping cart which provides a comfortable, safe, and more sanitary environment;

(g) to provide a new and improved universal, adaptable shopping cart cushion for a shopping cart that uniquely provides enhanced comfort and safety over the handle, seat, sides, top edges and back of the shopping cart seat;

(h) to provide a new and improved universal, adaptable shopping cart cushion for a shopping cart which provides a child's seat belt restraint system;

(i) to provide a new and improved universal, adaptable shopping cart cushion for a shopping cart to facilitate easy, fast, and efficient installation and removal of the cushion;

(j) to provide a new and improved universal, adaptable shopping cart cushion for a shopping cart with an elastic strap that stretches around the rolled cushion for easy and compact storage; and (k) to provide a new and improved universal, adaptable shopping cart cushion for a shopping cart which includes a strap with a fastener for attaching toys and other miscellaneous items to the cushion.

This invention is not limited in its application to the components set forth in the following description or illustrated in the drawings. The invention is capable of other embodiments and of being practiced and carried out in various ways. Also, phraseology and terminology employed herein are for description and should not be regarded as limiting. Further, the abstract is neither intended to define the invention of the application which is measured by the claims, nor is it intended to be limiting as to the scope of the invention in any way.

Please refer to the accompanying drawings and descriptive matter in which there are illustrated preferred embodiments of the invention for a better understanding of the invention, its operating advantages, improvements, and specific objects attained by its users.

BRIEF DESCRIPTION OF THE DRAWINGS

The universal, adaptable shopping cart cushion will be seen in an illustrative embodiment as shown in the attached drawings and will be fully understood and objects other than those listed above will become apparent when consideration is given to the detailed descriptions that follow.

REFERENCE NUMERALS

Figure 1:
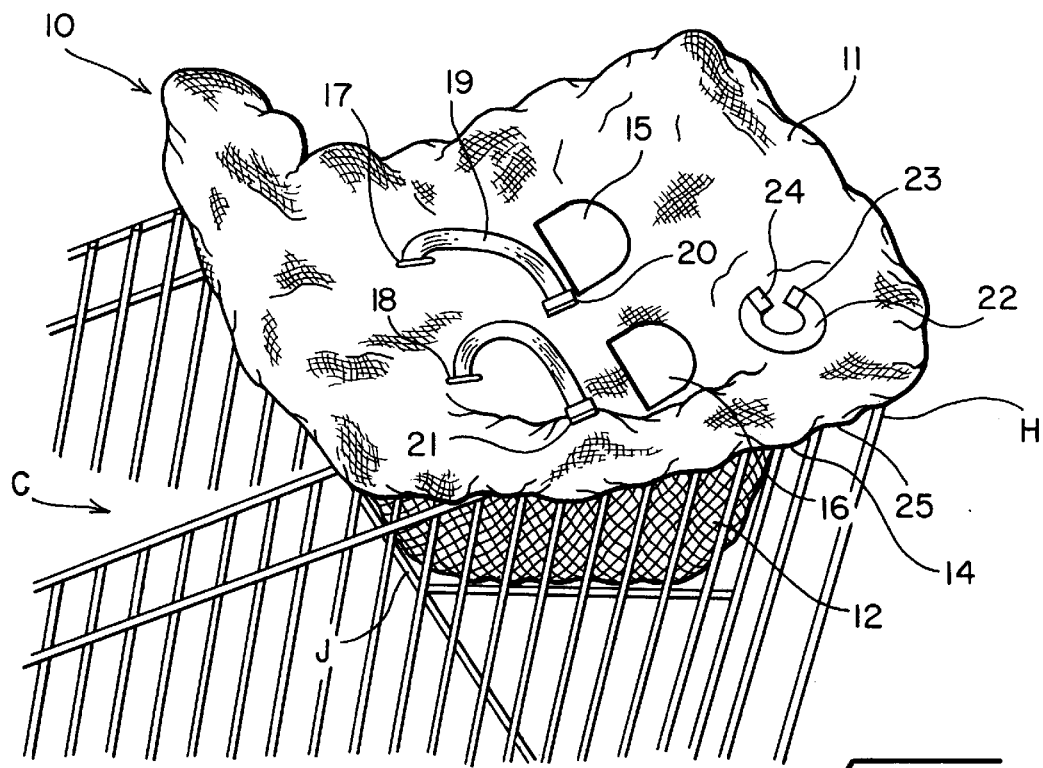
FIG. 1 is a perspective view of a universal, adaptable shopping cart cushion installed on the shopping cart seat of a conventional shopping cart.

10 Universal, adaptable shopping cart cushion
11 Top of cushion
12 Bottom of cushion
13 Batting
14 Elastic
15 Leg opening
16 Leg opening
17 Buttonhole
18 Buttonhole
19 Seat belt
20 Locking segment
21 Locking segment mate
22 Strap
23 Fastener
24 Fastener mate
25 Adjustable perimeter seam
26 Elastic strap
C Shopping cart
H Front grill of shopping cart seat
J Back pivoting grill of shopping cart seat

DESCRIPTION DETAIL OF THE INVENTION

With reference to the drawings. FIG. 1 displays a perspective view of a new and improved universal, adaptable shopping cart cushion expansion system which stretches and readily covers the entire shopping cart seat incorporating the concepts and principles of the present invention, and generally designated and described by the reference numeral 10. Specifically, the first embodiment 10 of our invention comprises an elongated/circle/rectangle or other geometric shaped cushion of a pre-shrunk, washable, padded, quilted, and foldable material. A top of cushion 11 and a bottom of cushion 12 envelopes all edges and gives complete coverage over handle, seat, sides, top edges, and a back pivoting grill of shopping cart seat J. Bottom of cushion 12 is formed from washable, pre-shrunk, padded, quilted, and foldable material. A batting 13 will be described later in greater detail. Top of cushion 11, bottom of cushion 12 quilted with batting 13, and a durable elastic 14 are stitched together around perimeter of a universal, adaptable shopping cart cushion 10 forming an adjustable perimeter seam 25. Front grill H of a shopping cart seat of shopping cart C is fixed and has openings (not shown) for legs of a child and therefore, a finished leg opening 15 and a finished leg opening 16 in cushion 10 are provided for the legs of a child riding in a shopping cart seat of a shopping cart C. Top of cushion 11 and bottom of cushion 12 are secured together around leg opening 15 and leg opening 16. Cushion 10 has a buttonhole 17 and a buttonhole 18 on back of cushion 10 to provide openings for a seat belt 19. Seat belt 19 is of strong, durable material. A locking segment 20 is secured to end portion of seat belt 19. A locking segment mate 21 is secured on the opposite end of seat belt 19. A portion of seat belt 19 secured to buttonhole 17 prevents seat belt from getting lost. Seat belt 19 is fed from buttonhole 17 through back pivoting grill of shopping cart seat J, across and back through back pivoting grill of shopping cart seat J and through buttonhole 18 where locking segment 20 and locking segment mate 21 are secured around the child. A Strap 22 is secured on cushion 10 near handle of shopping cart C (not shown). A fastener 23 is secured on one end of strap 22 and a fastener mate 24 is secured on opposite end of strap 22. Attaching fastener 23 to fastener mate 24 provides a loop for attaching toys and miscellaneous items. An adjustable perimeter seam (25) stretches over handle, seat, sides, top edges and back pivoting grill of shopping cart seat J, securing cushion 10 in place.

Figure 2:
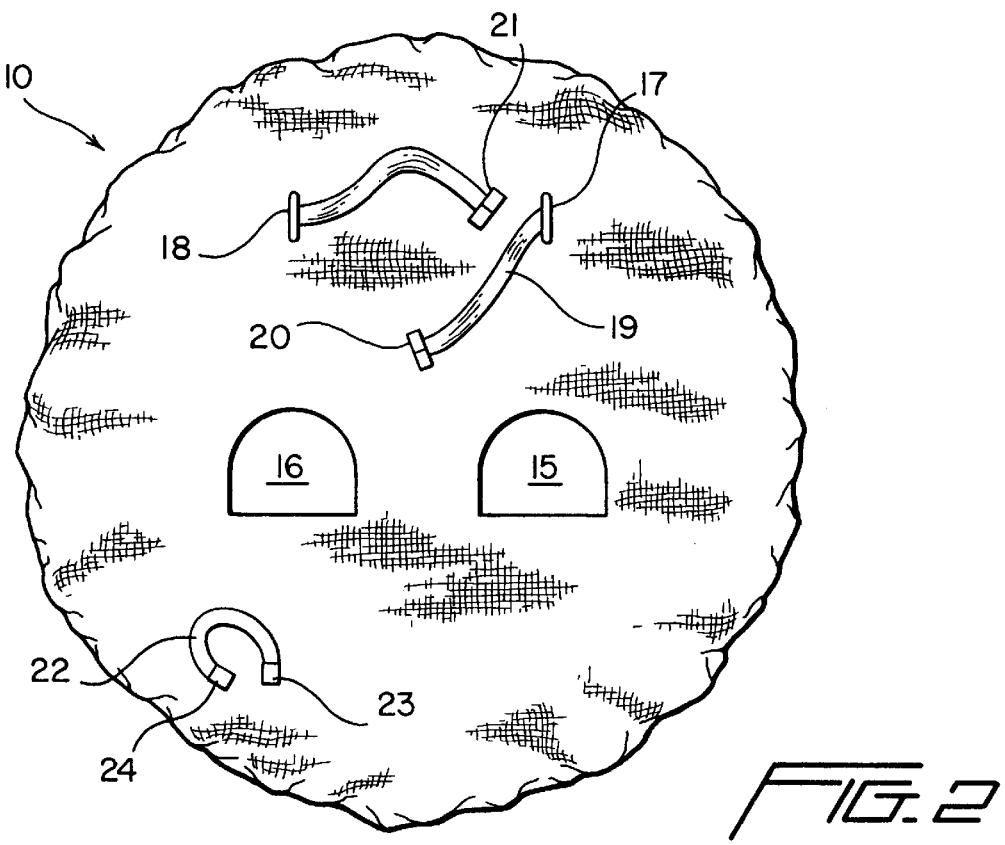
FIG. 2 is a perspective view of a universal, adaptable shopping cart cushion in a laid-out position with top cover facing up.

FIG. 2 gives a perspective view of top of cushion 11 in a flat laid-out position. An adjustable perimeter seam 25 (not shown) causes a portion of top of cushion 11 to be pulled under and not visible. Finished leg opening 15 and finished leg opening 16 are shown through the top of cushion 11. Ends of seat belt 19 are shown after being fed through buttonhole 17 and buttonhole 18 with locking segment 20 secured to end of seat belt 19 and locking segment mate 21 secured to opposite end of seat belt 19. Strap 22 with fastener 23 secured on one end of strap 22 and fastener 24 secured at opposite end of strap 22 is illustrated in an unfastened position. Strap 22 is secured to cushion 10.

Figure 3:
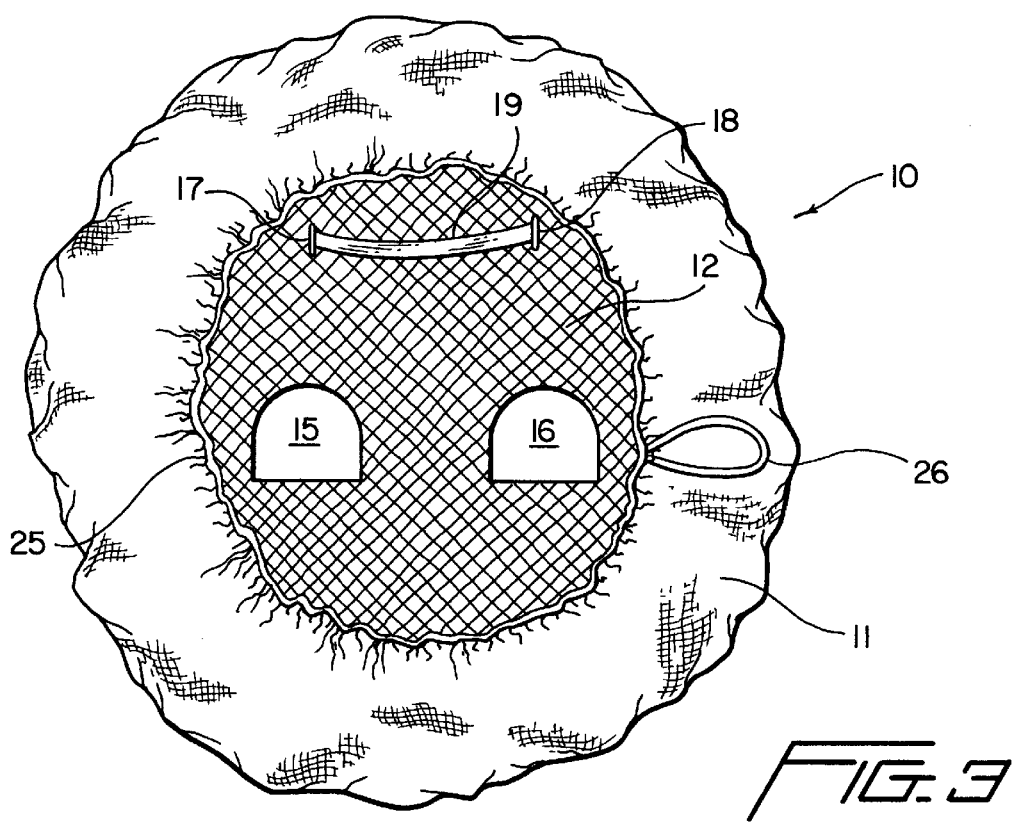
FIG. 3 is a perspective view of a universal, adaptable shopping cart cushion in a laid-out position with quilted back cover facing up.

FIG. 3 gives a perspective view of bottom of cushion 12 in a flat, laid-out position. An adjustable perimeter seam 25 causes a portion of top of cushion 11 to be pulled over bottom of cushion 12. Back of seat belt 19 is shown after being fed through buttonhole 17 and buttonhole 18. Finished leg opening 15 and finished leg opening 16 are viewed through bottom of cushion 12 An elastic strap 16 is stitched into perimeter seam 25 and is used to secure cushion 10 when rolled for easy, compact storage.

Figure 4:
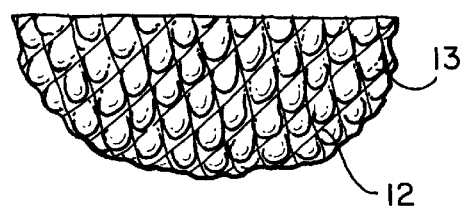
FIG. 4 is a perspective view of batting quilted to underneath side of back cover of a universal, adaptable shopping cart cushion.

FIG. 4 gives a perspective view of a batting 13 quilted to back side of bottom of cushion 12. Batting 13 is a washable, pre-shrunk, padded, foldable material with a weight deemed desirable for comfort. Quilting pattern and weight to be determined by artisans skilled in consumer demand and human engineering.

Figure 5:
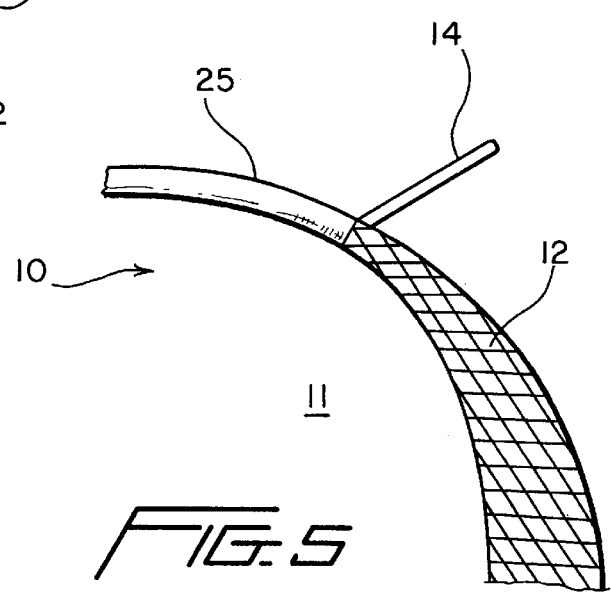
FIG. 5 is an edge view of a universal, adaptable shopping cart cushion's adjustable perimeter with the feed-through of elastic as the top and back covers are seamed together.

FIG. 5 gives an edge view of cushion 10 illustrating the construction of an adjustable perimeter seam 25. Around the perimeter of cushion i0, an elastic 14 is seamed together with top of cushion 11 and bottom of cushion 12 batting 13 which has been quilted to back side of bottom of cushion 12.

Figure 6:
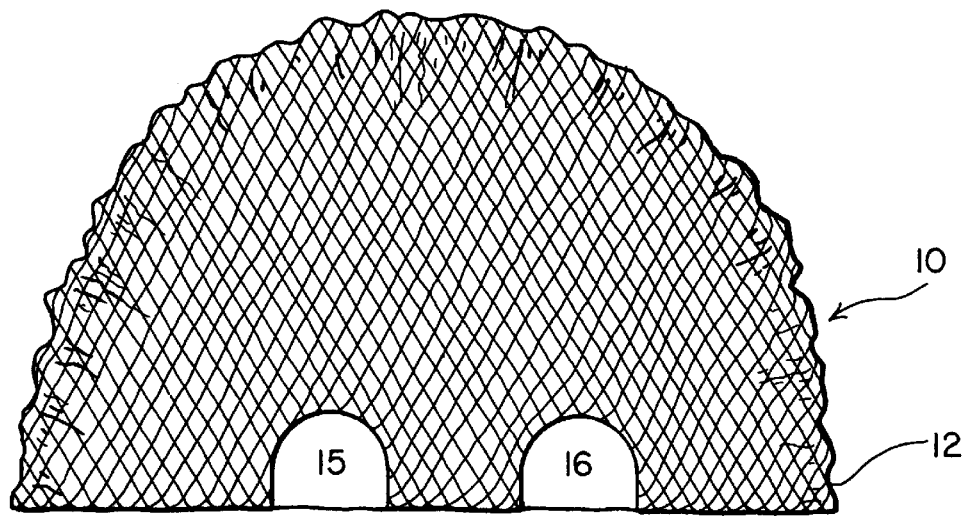
FIG. 6 is a perspective view of a universal, adaptable shopping cart cushion folded to a half-closed position.
Figure 7:
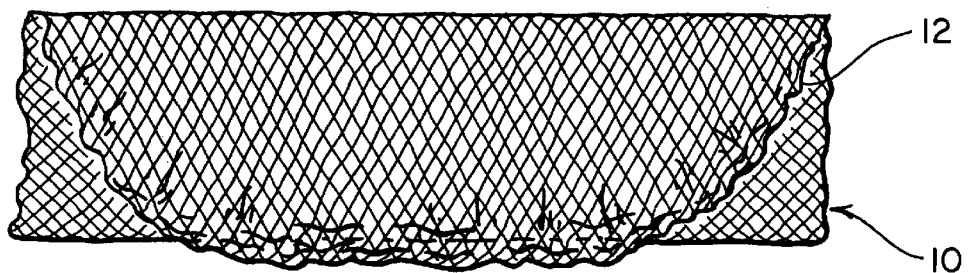
FIG. 7 is a perspective view of a universal, adaptable shopping cart cushion folded as in FIG. 6 and then folded again.

FIG. 6 gives a perspective view of cushion 10, as illustrated in FIG. 3, folded in half FIG. 7 gives a perspective view of cushion 10, as illustrated in FIG. 6, folded in half again and ready to be rolled for easy, compact storage.

Figure 8:
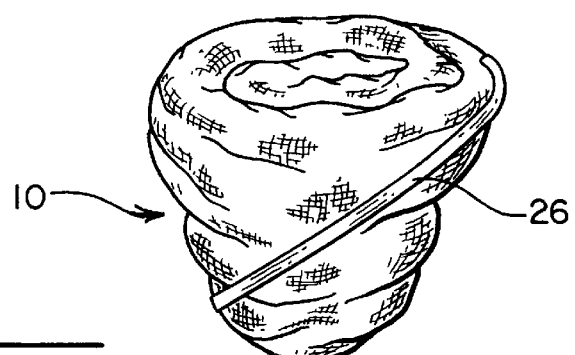
FIG. 8 is a perspective view of a universal, adaptable shopping cart cushion rolled and wrapped with an elastic strap to illustrate its easy, compact storage position.

FIG. 8 gives a perspective view of cushion 10, as illustrated in FIG. 7, rolled up and secured with elastic strap 26 stretched around rolled cushion 10 for easy, compact storage.

From the description above, a number of improvements and advantages of our universal, adaptable shopping cart cushion become evident:

(a) An adjustable perimeter not only provides easy, fast, and efficient installation and removal of the cushion, but is adaptable to numerous style shopping carts of various sizes, shapes, and construction.

(b) An adjustable perimeter provides a unique means for easily and quickly expanding complete coverage over the entire shopping cart seat.

(c) A child is better protected from hot, cold, wet, soiled or unsanitary seats.

(d) A durable, reliable, and washable construction provides a means of easily maintaining a cleaner, more sanitary environment for the child.

(e) A child is better protected from being pinched, scratched or harmed by the hard movable shopping cart seat.

(f) The cushion covers the handle, seat, sides, top edges and back of shopping cart seat to provide a safer and more sanitary environment for the child.

(g) Finished openings for a child's legs provide comfort and easy seating of child.

(h) A soft batting of the cushion and complete coverage of the shopping cart seat provides a pillow-like comfort for the child riding in the shopping cart seat.

(i) A seat belt passes from the cushion through the shopping cart grill and secures around the child providing greater safety while in the shopping cart seat.

(j) An additional feature includes a strap fastener for attaching toys or miscellaneous items to the cushion.

(k) An elastic strap stretches around the rolled cushion for easy, compact storage.

(l) A simplicity of design and construction allows for a low cost of manufacturing resulting in lower retail pricing and greater availability to the general consumer.

Operation—FIGS. 1, 6, 7, 8

The use of the universal, adaptable shopping cart cushion is very simple and easy to use because of the adjustable perimeter design that stretches over the shopping cart handle extending across the seat, sides, top edges and over the back, readily encompassing the entire shopping cart seat. First, open cushion 10, as illustrated in FIG. 2, with top of cushion 11 facing installer. Place bottom of cushion 12, as illustrated in FIG. 3, in shopping cart seat and align finished leg opening 15 and finished leg opening 16 with leg openings in front grill of shopping cart seat H. With leg openings aligned, this will place seat belt 19, buttonhole 17 and buttonhole 18 against back pivoting grill of shopping cart seat J. Pull adjustable perimeter seam 25 of cushion 10 over handle of front grill of shopping cart seat H, then stretch adjustable perimeter seam 25 around sides and over back pivoting grill of shopping cart seat J covering the entire shopping cart seat. Seat belt 19 is fed from buttonhole 17 through back pivoting grill of shopping cart seat J across and back through back pivoting grill of shopping cart seat J and through buttonhole 18. Place child in cushion 10. Pull ends of seat belt 19 around child, fasten locking segment 20 to locking segment mate 21 securing the child in shopping cart seat.

To remove universal, adaptable shopping cart cushion 10, first unlock scat belt locking segment 20 and locking segment mate 21. Remove child from seat. Pull scat belt 19 through buttonhole 18 and through back pivoting grill of shopping cart seat J leaving seat belt secured to buttonhole 17. Stretch adjustable perimeter seam 25 of universal, adaptable shopping cart cushion 10 from off the handle of front grill of shopping cart seat H and lift shopping cart cushion 10 off the shopping cart seat.

As shown in FIGS. 6, 7, and 8 (all perspective views) when the adaptable shopping cart seat 10 is folded in half laterally along leg openings 15 and 16, folded in half again, then rolled from one end to the other and secured with elastic strap 26, the adaptable cushion is ready for easy, compact storage.

I believe because of a simple improved utilitarian design using an adjustable perimeter, this invention completely and easily covers various shopping cart seats providing a comfortable, more sanitary, and safer environment for a child.

Summary and Ramifications

Accordingly, the present invention provides a new, unique and improved universal, adaptable shopping cart cushion which readily expands and contracts to completely cover the child's seating area, including the handle, seat, sides, top edges, and back of the shopping cart seat. Furthermore, the universal, adaptable shopping cart cushion has the additional advantages in that:

it provides protection from open side edges where children touch, mouth and/or nap;

it allows protection from the results of weather conditions, soiled carts, and provides a comfortable, more sanitary and safer environment for the child;

it provides cushioning from the batting for extra comfort and protection;

it provides easy adjustment to accommodate shopping carts of various sizes, shapes and construction;

it permits easy installation and removal;

it provides finished leg openings for comfort and easy seating of child;

it provides an elastic strap for easy, compact storage;

it provides buttonholes for feed-through of seat belt;

it provides a strap for holding toys and miscellaneous items;

it is of a durable, comfortable, reliable and washable construction;

it permits washing to easily maintain a clean and sanitary environment for the child;

it provides simplicity of design to maintain competitive retail price;

it provides an easy-to-use child restraint seat belt system, and;

it provides a cover that readily expands and contracts for coverage over the handle, seat, sides, top edges and back of various shopping cart seats.

It is to be understood that the parts of the present invention include variations in size, type of material, shape, form, function, manner of operation, assembly and use without departing from the scope of the invention.

Furthermore, it is to be understood that the means for adjusting the perimeter is not limited to elastic but may include drawstrings or any other method of contracting or extending the perimeter.

Thus, the scope of the invention should be determined by the appended claims and their legal equivalents, rather than by the examples given.

The foregoing is considered as illustrative only of the principles of the invention. Furthermore, to skillful artists, it is not desired to limit the invention to the exact construction, geometric shape or operation shown and described; and accordingly, all suitable modifications and equivalents such as to be used for: public high chairs, public strollers, booster seats, bicycle child carriers, park swings, or other similar child seating arrangement, may be resorted to, falling within the scope of the invention.

What is claimed is:

1. A cover which is removably mounted over a seat of a shopping cart, said shopping cart including an integrally formed child seat including a seat bottom, and a seat back, said shopping cart further including a handle and a seat back, said shopping cart further including a handle for pushing said shopping cart, said cover comprising:

a sheet of padded material having an upper surface, a bottom surface, and a continuous peripheral edge, said sheet being sized so as to cover a shopping cart seat of a shopping cart over which said cover is placed, including said seat back of said shopping cart seat over which said cover is disposed while simultaneously covering said handle of said shopping cart and draping over the edges of said shopping cart over which said cover is disposed located between said seat back and said handle;

elastic means integrally formed with said cover and extending substantially continously about an entire length of, said peripheral edge, said elastic means being of a length shorter than said peripheral edge;

said elastic means urging said cover into a first predetermined shape and causing said cover and peripheral edge to form a pouch like structure having a single opening, said opening being flexible, said cover covering the seat back, said seat, said handle, and said shopping cart edges disposed between said seat back and said handle when said cover is disposed over the seat of a shopping cart, said elastic means acts to hold said cover in place;

at least a first aperture disposed in said sheet for allowing the legs of a child to extend therethrough; and whereby said sheet when disposed on a shopping cart seat provides cushioning of said the shopping cart handle, seat back, shopping cart edges between said handle and said back, and said seat.

2. A cover in accordance with claim 1, comprising:

a second aperture disposed in said sheet, said first and second apertures disposed as to allow the legs of a child placed on said cover when said cover is disposed on said seat, to extend through leg openings of the said cart.

3. A cover in accordance with claim 2, comprising:

third and forth apertures disposed in said sheet for allowing first and second portions of a seat belt to extend therethrough.

4. A cover in accordance with claim 1, comprising:

third and forth apertures disposed in said sheet for allowing first and second portions of a seat belt to extend therethrough.

5. A cover in accordance with claim 1, comprising:

a strap extending from said sheet for retaining a toy or other item.

6. A cover in accordance with claim 1, comprising:

an elastic band extending from said sheet, said elastic band being disposed so as to permit the stretching around of said sheet when said sheet is gathered into a storage arrangement, said elastic band retaining said cover in said storage arrangement.

7. A cover in accordance with claim 1, wherein:

said sheet comprises cushioning material.

8. A cover in accordance with claim 1, wherein:

said material comprises washable fabric.

9. A cover in accordance with claim 1, wherein:

said sheet of material comprises an upper layer, a bottom layer and padding disposed between said upper and bottom layers.

10. A cover in accordance with claim 9, wherein:

said upper layer, said bottom layer and padding are quilted.

11. A cover in accordance with claim 9, wherein:

said upper layer and said bottom layer are affixed together proximate said peripheral edge.

12. A cover in accordance with claim 11, wherein:

said elastic means comprises an elastic band affixed to said material at said peripheral edge.

13. A cover in accordance with claim 1, wherein:

said elastic means comprises an elastic band.

14. A cover in accordance with claim 13, wherein:

said elastic band is sewn to said material at said peripheral edge.

* * * * *